United States Patent
Reynolds et al.

(10) Patent No.: US 10,863,717 B2
(45) Date of Patent: Dec. 15, 2020

(54) ANIMAL PACIFIER

(71) Applicants: Damon Reynolds, Baxter, IA (US); Joshua Ness, Baxter, IA (US); Caleb Ness, Baxter, IA (US); Isaac Altman, Baxter, IA (US); Anneliese Wilson, Baxter, IA (US); Isaiah Wilson, Baxter, IA (US); Easton Klein, Baxter, IA (US); Holly Zahurones, Baxter, IA (US); Carlee Zahurones, Baxter, IA (US); Asher Wood, Baxter, IA (US)

(72) Inventors: Damon Reynolds, Baxter, IA (US); Joshua Ness, Baxter, IA (US); Caleb Ness, Baxter, IA (US); Isaac Altman, Baxter, IA (US); Anneliese Wilson, Baxter, IA (US); Isaiah Wilson, Baxter, IA (US); Easton Klein, Baxter, IA (US); Holly Zahurones, Baxter, IA (US); Carlee Zahurones, Baxter, IA (US); Asher Wood, Baxter, IA (US)

(73) Assignee: Crown Innovations, LLC, Baxter, IA (US)

( * ) Notice: Subject to any disclaimer, the term of this patent is extended or adjusted under 35 U.S.C. 154(b) by 431 days.

(21) Appl. No.: 15/828,978

(22) Filed: Dec. 1, 2017

(65) Prior Publication Data
US 2018/0153136 A1 Jun. 7, 2018

Related U.S. Application Data

(60) Provisional application No. 62/428,719, filed on Dec. 1, 2016.

(51) Int. Cl.
*A01K 9/00* (2006.01)
*A01K 15/02* (2006.01)

(52) U.S. Cl.
CPC ............ *A01K 9/005* (2013.01); *A01K 9/00* (2013.01); *A01K 15/025* (2013.01)

(58) Field of Classification Search
CPC ......... A01K 9/005; A01K 9/00; A01K 15/025
See application file for complete search history.

(56) References Cited

U.S. PATENT DOCUMENTS

| | | | | |
|---|---|---|---|---|
| 2,119,691 A | * | 6/1938 | Vanderbilt | A01K 9/00 119/71 |
| 2,833,244 A | * | 5/1958 | Bohlman | A01K 15/025 119/708 |
| 5,322,036 A | * | 6/1994 | Merino | A63H 15/04 119/707 |
| 6,168,034 B1 | * | 1/2001 | Perrone | A61J 9/00 215/11.1 |
| 2003/0188696 A1 | * | 10/2003 | Woltmann | A01K 31/06 119/467 |
| 2004/0065635 A1 | * | 4/2004 | Turnbough | A47G 21/145 215/11.1 |
| 2011/0024599 A1 | * | 2/2011 | Finell | A61J 17/00 248/523 |

(Continued)

*Primary Examiner* — Jessica B Wong
(74) *Attorney, Agent, or Firm* — Zarley Law Firm, P.L.C.

(57) ABSTRACT

A livestock sucking device or pacifier has a nipple with a shaft and a base. A weighted member is connected to a lower surface of the base. The weighted member has a partially spherical wall that forms an enclosed chamber. A weight is disposed within the chamber.

3 Claims, 2 Drawing Sheets

(56) References Cited

U.S. PATENT DOCUMENTS

2013/0167780 A1* 7/2013 Axelrod ............... A01K 15/025
                                                    119/710
2015/0066083 A1* 3/2015 Ramos ................. A61J 17/001
                                                    606/235

* cited by examiner

ANIMAL PACIFIER

CROSS REFERENCE TO RELATED APPLICATION

This application claims the benefit to U.S. Provisional Application Ser. No. 62/428,719 filed on Dec. 1, 2016.

BACKGROUND OF THE INVENTION

This invention relates to the production of cattle, specifically calves orphaned, abandoned or separated to be bottle fed. It is to maintain the health or offer enrichment for calves under care of humans.

Calves in the same pen often suck on each other, known as cross-sucking, causing health concerns. Calves will suck on each other's ears, tails and even navels causing health problems such as hair loss, sickness and in some cases even can be fatal in the case of navel infections.

Also calves at feeding time can rush the care-giver or battle with other calves for their turn to feed. Keeping them occupied can help offer an enrichment activity for the calves to wait therefore making it easier for the care-giver to feed each one.

An objective of the present invention is to provide a livestock sucking device that reduces health problems for livestock.

Another objective of the present invention is to provide a livestock sucking device that provides an enriching activity for livestock.

These and other objectives will be apparent to those having ordinary skill in the art based upon the following written, claims, and drawings.

SUMMARY OF THE INVENTION

A livestock sucking device has a nipple with a shaft, a tip, and a base. The nipple is connected to a weighted member or a bracket.

The weighted member has a partially spherical wall connected to a lower surface of the base that forms a hallow chamber. An egg shaped weight, balanced by a washer, is disposed within the chamber.

DETAILED DESCRIPTION OF THE PREFERRED EMBODIMENT

Figure 1:
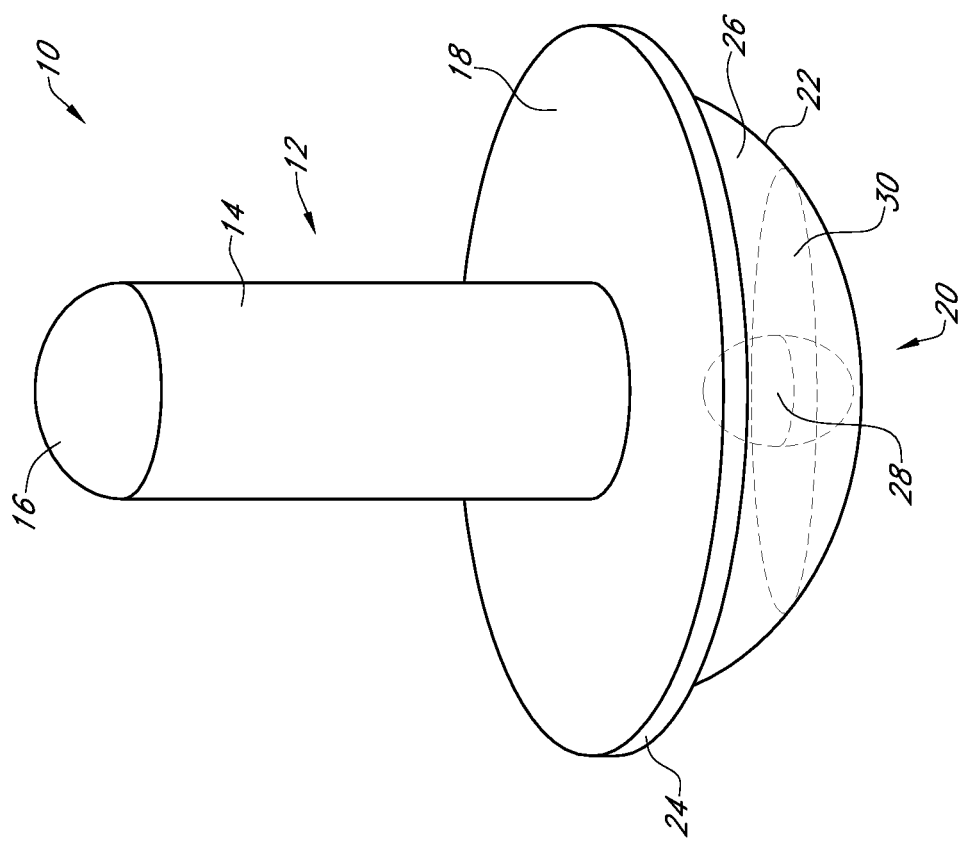
FIG. 1 is a perspective section view of a livestock sucking device.
Figure 2:
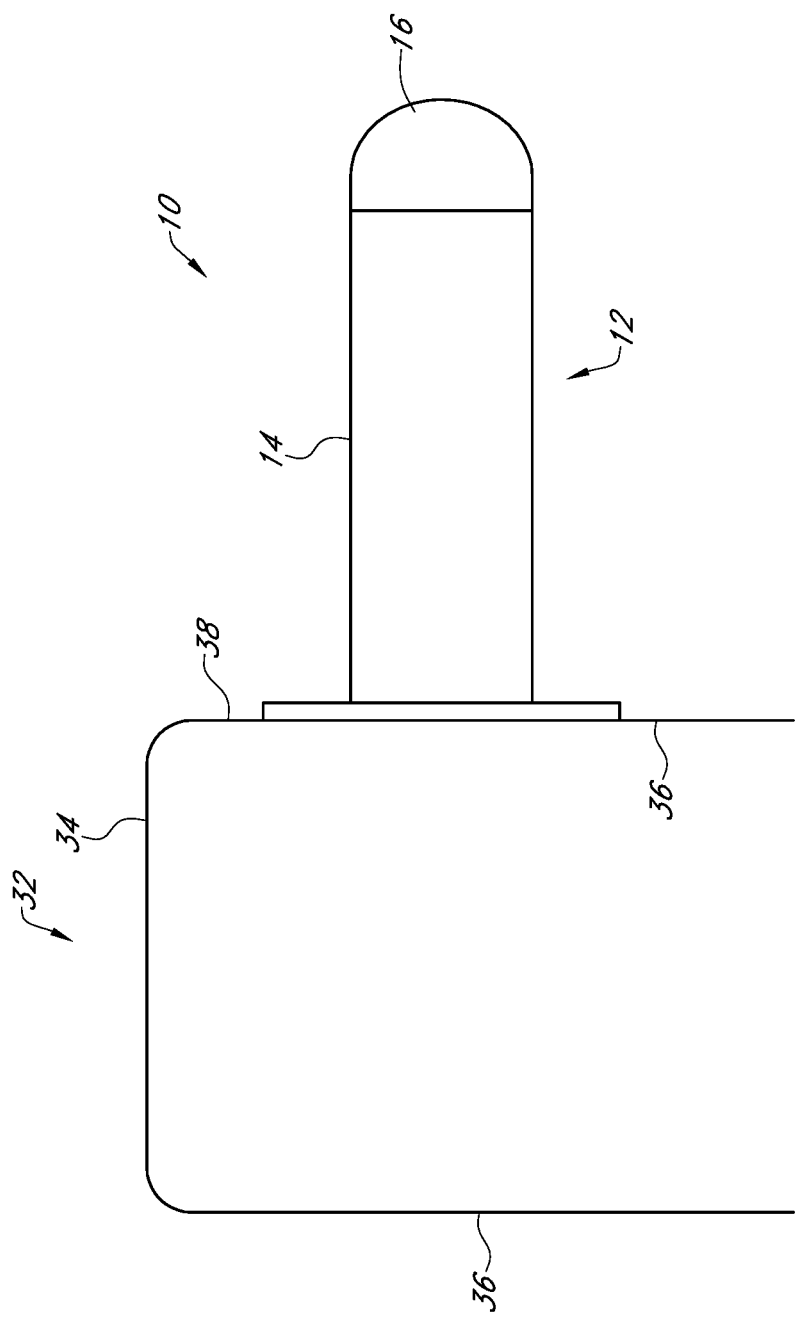
FIG. 2 is a side view of a livestock sucking device.

Referring to the Figures, a livestock sucking device or pacifier 10 includes a nipple 12 having a shaft 14 with a rounded tip 16. The shaft 14 is connected to a base 18 that preferably is circular. The tip is preferably made of silicone.

Connected to the base 18 of the nipple 12 is a weighted member 20. The weighted member 20 is of any size, shape, and structure. In a preferred example, shown is a weighted member 20 having a partial spherical wall 22 connected to a lower surface 24 of the base 18 of the nipple 12 to form an enclosed hollow chamber 26. The spherical shape maintains the pacifier in a nipple up orientation which is easier for a calf to access.

Disposed within the hollow chamber 26 is a weight 28. The weight 28 is of any size and shape and preferably egg shaped. To balance the weight 28, the weight 28 is inserted through a washer 30 that engages a wall 22.

In use, the device 10 is presented to a calf to suck on the nipple 12. If the nipple 12 falls to the ground, the weighted member 30 and partial spherical wall 22 will tend to cause the device to land nipple up which is easier for the calf to access.

Alternatively, the nipple 12 is attached to a bracket 32 and the bracket is attached to a board or fence. (Not shown). Preferably, the bracket is U-shaped having a top wall 34 and a pair of side walls 36. The bracket is adapted to receive a board between the side walls 36. The nipple is attached to an outer surface 38 of one of the side walls 36.

Accordingly, a livestock sucking device has been disclosed that at the very least meets all of the stated objectives.

What is claimed is:

1. A livestock sucking device, comprising:
   a nipple having a shaft connected to a base;
   a weighted member connected to a lower surface of the base;
   wherein the weighted member has a wall that forms a hollow chamber that receives a weight, and the weight is inserted through a washer that engages the wall to balance the weight.

2. The device of claim 1 wherein the wall of the weighted member is partially spherical.

3. The device of claim 1 wherein the weight is egg shaped.

* * * * *